UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

SULFUR DYES AND PROCESS OF MAKING SAME.

1,314,928.  Specification of Letters Patent.  Patented Sept. 2, 1919.

No Drawing.  Application filed September 27, 1917.  Serial No. 193,478.

*To all whom it may concern:*

Be it known that I, CHESTER E. ANDREWS, a citizen of the United States, residing at Pittsburgh, in the county of Allegheny and State of Pennsylvania, have invented certain new and useful Improvements in Sulfur Dyes and Processes of Making Same, of which the following is a specification.

My present invention relates to the manufacture of certain new sulfurized dyestuffs. These new compounds are formed by the action of sulfur and alkali sulfids upon certain nitrogen-containing compounds of cymene, most of which can be prepared according to my copending patent applications, Serial Numbers 191,245; 191,605; 191,483 and 192,783, all filed September 1917. Such compounds are 1-methyl-2-amino-4-isopropyl-benzene; 1-methyl-3-amino-4-isopropyl-benzene; 1-methyl-2-amino-4-isoprophyl-5-nitro-benzene; 1-methyl-2-amino-4-isopropyl-5-amino-benzene; 1-methyl-2-hydroxy-4-isopropyl-5-amino-benzene; mono- and dialkyl derivatives of the above amins, acetyl and formyl derivatives of above amins; also OH compounds of cymene, such as 1-methyl-2-hydroxy-4-isopropyl-5-nitro-benzene; or more complex cymene derivatives, for example nitroso derivatives of these phenols and amins; amido-azo-cymene; disazo compounds of 2 molecules of diazo-1-methyl-2-amino-4-isopropyl-5-nitro-benzene coupled with phenol or one molecule of this compound and one molecule of 1-methyl-2-amino-4-isopropyl-benzene; dicymyl-amin; dimethyl-diisopropyl-benzidin, and many others.

The reaction may be carried out with any one of these alone or with suitable combinations of two or more. One or more of these compounds and nitrogen-containing compounds other than those derived from cymene may also be used. Suitable compounds of this character are anilin, di-methyl-anilin, acetanilid, nitroso-dimethyl-anilin, nitroso-phenol, para-phenylene-diamin, para-amino-acetanilid, para-nitranilin, para-nitro-phenol, acetyl-nitramin, para-amino-dimethyl-anilin, ortho- and para-amino-phenol, amino-azo-benzene, amino-azo-toluene, meta-toluylene diamin, meta-phenylene-diamin, 1, 2, 4-dinitro-phenol, diphenyl-amin, dinitro-oxy-diphenylamin, indophenols, indamins and many others. Such a combination might be 1-methyl-2-hydroxy-4-isopropyl-5-amino-benzene and 3-4-dinitro-phenol.

Example 1: 12 parts of 1-methyl-2-amino-4-isopropyl-5-amino-benzene, together with 10 parts meta toluylene diamin and 50 parts of sulfur are gradually heated to about 200° and kept at that temperature for about 5 hours. Hydrogen sulfid is evolved. The mass is then allowed to cool. When cold, the melt is pulverized and about 3 times its weight of crystals of sodium sulfid added, together with a small amount of water. This mixture is heated to about 110° and held at that temperature until a sample is entirely soluble in water. The mixture is then diluted and the dye precipitated with acids or by blowing a current of air through the solution.

This dye is insoluble in acid or neutral solution, but readily soluble in alkaline sulfids and the solution in the latter dyes unmordanted cotton in fast yellow shades.

Example 2: 40 parts of para aminophenol, 34 parts of acetyl-amino-cymene, and 38 parts of sulfur are melted together in a vessel furnished with a stirring mechanism at a temperature of 200–220° till the evolution of hydrogen sulfid is almost complete. The mass is then powdered and dissolved in about 500 parts of water containing 45 parts of sodium hydroxid solution of 40° Baumé, after which the solution is precipitated by acids and filtered. It forms a black powder, difficultly soluble in hot water, but readily soluble in sodium sulfid solution from which it dyes unmordanted cotton deep black.

Almost any shade of color can be obtained, except reds, by varying not only the constituents of the melt, but also the proportions of the constituents. The sulfur dyes produced in accordance with the process of the present application, namely sulfur dyes containing a residue of cymene or a cymene derivative, are in practically all instances more brilliant in color than the corresponding sulfur dyes produced from benzene derivatives in a similar manner. All of them dye unmordanted cotton directly, but in some cases the addition of certain metallic salts to the dye bath produces more brilliant dyeings. Copper sulfate is a suitable salt to add.

What I claim is:

1. A class of sulfur dyes derived from a nitrogen-containing cymene compound, said dyes being capable of dyeing unmordanted cotton, and being of somewhat more brilliant colors respectively than the corresponding sulfur dyes derived from the corresponding benzene compounds.

2. The herein described sulfur dye comprising the reaction products of 1-methyl-2-amino-4-isopropyl-5-amino-benzene, meta toluylene diamin and sulfur.

3. In the process of producing sulfur dyes, the step which comprises heating together with sulfur, a nitrogen-containing cymene derivative, and a nitrogen derivative of an aromatic hydrocarbon, to a temperature sufficient to form $H_2S$.

4. In the process of producing sulfur dyes, the step which comprises heating together with sulfur, a nitrogen-containing cymene derivative, and a nitrogen-containing derivative of another aromatic hydrocarbon, to a temperature sufficient to form $H_2S$.

5. The herein described process of making a sulfur dye which comprises heating to about 200° C., a mixture of 1-methyl-2-amino-4-isopropyl-5-amino-benzene, meta toluylene diamin and sulfur, reacting thereupon with sodium sulfid and water, and precipitating the dye from the liquor by blowing air through a solution of the product.

6. The herein described method of producing a yellow sulfur dye which comprises melting together 12 parts of 1-methyl-2-amino-4-isopropyl-5-amino-benzene, 10 parts of meta toluylene diamin and 50 parts of sulfur, maintaining the heated mass at a temperature of about 200° C., for five hours, pulverizing the melt, and adding three times its weight of sodium sulfid and water, heating to about 110° C., until the mass becomes soluble in water, diluting with water and precipitating the dye from the solution.

In testimony whereof I affix my signature.

CHESTER E. ANDREWS.